G. MOE.
METHOD OF TAKING PHOTOGRAPHIC MEASUREMENTS
APPLICATION FILED AUG. 28, 1919.

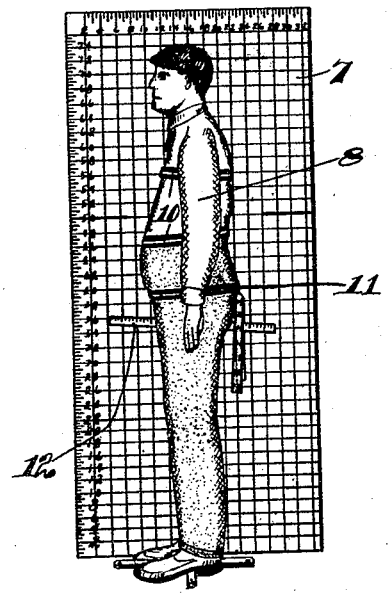
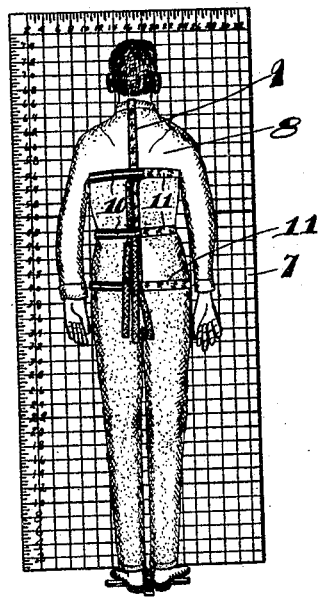
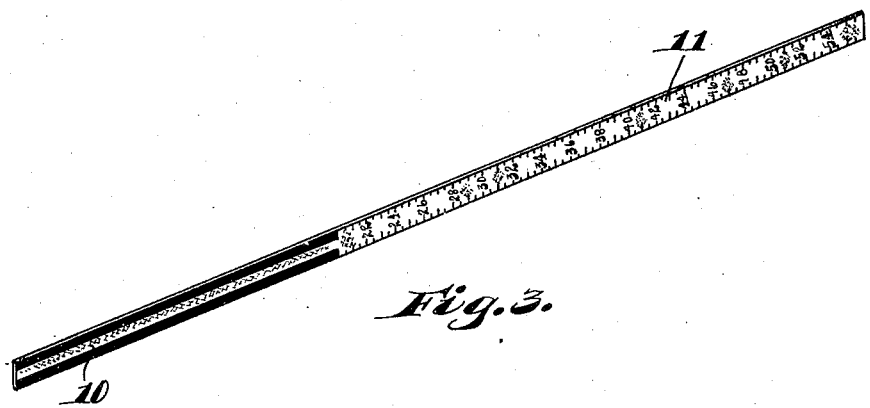

1,414,481.

Patented May 2, 1922.
2 SHEETS—SHEET 2.

Witnesses:
C. E. Wessels.
Thos. S. Donnelly

Inventor:
Gerhard Moe,
By Joshua R. H. Potts
Attorney.

UNITED STATES PATENT OFFICE.

GERHARD MOE, OF EAU CLAIRE, WISCONSIN.

METHOD OF TAKING PHOTOGRAPHIC MEASUREMENTS.

1,414,481.  Specification of Letters Patent.  Patented May 2, 1922.

Application filed August 28, 1919. Serial No. 320,507.

*To all whom it may concern:*

Be it known that I, GERHARD MOE, a citizen of the United States, and a resident of the city of Eau Claire, county of Eau Claire, and State of Wisconsin, have invented certain new and useful Improvements in the Methods of Taking Photographic Measurements, of which the following is a specification.

My invention relates to new and useful improvements in the method of taking photographic measurements, and has for its object the provision of a method of taking photographic measurements which will be accurate, simple and efficient in its use. Another object is the provision of a tape for use in taking photographic measurements, which is simple in structure and highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of an object showing my invention applied.

Fig. 2 is a rear elevational view of an object showing my invention applied.

Fig. 3 is a perspective view of a portion of the tape used.

My invention is adapted to be used for taking a person's measurements by disposing the measuring device upon the person and then photographing the same. This system of taking measurements is used primarily by mail order tailoring houses, although the utility of the method is by no means limited to such establishments. A great saving of time may be accomplished by the use of my invention in any tailoring or corset shop, and especially is it useful and highly beneficial in an establishment where a large number of persons are measured daily. My invention may be used either separately from or in conjunction with a photographic measuring chart. This measuring chart is positioned so as to form a back ground for the person photographed and is divided into a number of squares which are of known dimension. These squares into which the chart is divided, are indicated by numerals which do not indicate the true dimensions of the squares. However, when these squares are viewed from some point at a distance from the measuring chart through the lens of a camera, the distance between the perspective lines obtained and the squares will measure the actual distance indicated on the chart. For instance, the actual dimensions of the squares on the chart may be 2¼ inches, whereas the indicating numeral mounted upon the chart is 2 inches. By moving backward from the back ground to the camera or the lens until the perspective angles between the lens and the graduations on the back ground have taken up one quarter of an inch from each 2¼ inches square, the distance is then arrived at when an object photographed, using the chart as a back ground, will subtend in its true and actual measurements the distance indicated by the numbers on the photographic chart. In this way the body photographed will cover on the back ground the actual diameters of that body in every direction, these diameters being measured by the squares formed in the chart. Of course, the height is also determined in this way. In taking these photographs, the person to be measured is positioned a certain distance from the chart, this distance being the exact position at which the perspective angles between the lines and the graduations on the back ground have taken up the difference between the actual measurements of the squares on the chart and the number on the chart indicating the size of the squares. In my present invention a photographic measuring chart 7 is used as a back ground when the object 8 to be measured is photographed, although the use of the chart 7 in this invention may be entirely dispensed with, the chart 7 serving merely as a check upon the other measurements taken of the person by means of the tape.

Figure 6:
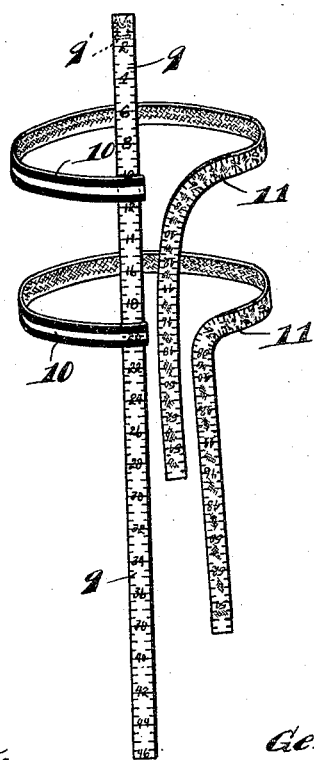
Fig. 6 is a perspective view of the tape used in my invention.
Figure 7:
Fig. 7 is a side elevation of a tape used in my invention.

The tape used in taking these photographic measurements, as shown in Fig. 6, comprises a tape having bands which pass around the body of the person to be measured. These bands may be separate and independent, and a single band may be used or a plurality of them. The band consists of two portions, one portion 10 of which extends a distance of about 20 inches. This portion 10 extending throughout its length, is colored with contrasting colors, and the remaining portion 11 of the tape does not bear the contrasting colors, but has numbers appearing thereon indicating the length. I do not wish to be limited to a tape having one portion of contrasting colors, as the tape itself may be formed of a uniform color and provided with numbers or similar indicating means which are of contrasting color to the background, that is the tape, upon which they are mounted. In use, the tape is passed around the body of the person to be measured, and the person is then photographed, so as to show on the photographic plate the juncture between the end of the tape and that part of the portion 11 which is utilized in measuring, so as to indicate the length of the tape in inches which is passed around the body of the person measured, as will be readily understood. The portion 10 has the contrasting colors for the purpose of showing in the photograph clearly and distinctly where the measurements were taken. For instance, in Fig. 2, were the portion 10 to be entirely black or of one solid color, which would correspond with the color of the garment worn by the person measured, the photograph would not show whether the tape was passed under the arm of the person or over the arm. By coloring the portion 10 with two contrasting colors, some part of the portion 10 will always appear distinctly and clearly in the photograph. This feature of my invention is highly important, as the measurements of the person measured are sometimes taken at different points and at different angles, so that, if the tape does not show out clearly in the photograph, it is impossible to ascertain the true and correct measurements of the person measured.

I have also provided a tape 9 which is adapted to be hooked over the collar of the person measured by means of the hook 9' and hung down the back. This tape is also formed of contrasting colors to the back ground upon which it is mounted, or it has mounted upon it some means of indicating its length, which are of contrasting colors to the tape itself. This tape is shown merely as a model of the different uses to which my invention may be applied, as it is intended to provide a means of obtaining the actual measurements of a person by photographing, and to bring this about, it may sometimes be necessary to cover the body with a large number of tapes made in the manner indicated, so that they will show up clearly in the photograph and show the actual dimensions or measurements while they are on the body.

Figure 4:
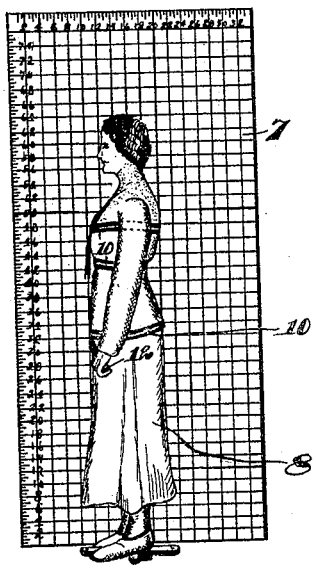
Fig. 4 is a view similar to Fig. 1, showing my invention applied to a woman.
Figure 5:
Fig. 5 is a view similar to Fig. 2, showing my invention applied to a woman.

In using my invention in conjunction with the photographic chart, it is necessary that the person measured be a predetermined distance from the chart which forms the back ground, when the camera is a predetermined distance from the back ground. A variation of this distance will alter the field of the photographic chart covered by the person to be measured, when viewed from the camera. Consequently, the measurements of the person which are computed from the image, as shown against the photographic chart in the photograph, would be incorrect. To clearly and definitely and accurately establish the distance of the person to be measured from the photographic chart, I have provided a measure 12 which is of known length. This measure 12 may be inserted in the crotch or centrally on the body and held there, as clearly shown in Fig. 1. When the measure 12, which is positioned centrally relatively to the body of the person to be measured, covers its true length upon the photographic chart 7 when viewed from the camera, the person is then at the correct distance from the photographic chart. When a rear view of the person to be measured is to be taken, the member 12 may be held in the hands of the person, as shown in Fig. 5.

When the person to be measured is photographed with the measure positioned upon him, as described, the measurements of the person may then be determined by comparing the image of the photograph with a measuring chart formed on a known scale determined from the measuring means which are positioned upon the person measured, this scale, of course, being regulated in proportion to the size of the photograph of the object which is taken. In taking the measurements of a person having a measure of known length positioned upon him, the measuring chart may or may not be used as a back ground. When the measuring chart is not used as a back ground, the measurements will be ascertained solely from a scale determined from the measure positioned upon the measured object. The photograph image bearing the measure of known length will then be compared with the chart constructed as aforesaid.

It is thus seen that by the use of my tape, constructed as described, I have provided a means whereby photographic measurements may be taken accurately. Also, by the use of my tape, the measurements may be taken quickly, irrespective of the back ground which may be used. When the back ground does not consist of a measuring chart, the measurements of the person may be determined from the numbers which appear on the measuring tape. In this case, of course, a larger number of tapes are necessary, or a larger number of photographs would be necessary with the tapes positioned at different places.

While I have illustrated and described the preferred form of construction for carrying my invention into effect, this is capable of variation and modification without departing from the spirit of the invention. I therefore, do not wish to be limited to the precise details of the construction set forth, but desire to avail myself of such variations and modifications as come within the scope of the appended claim.

Having described my invention, what I claim as new and desire to secure by Letters Patent, is:—

In taking photographic measurements, the method of determining the distance of the object measured from the measuring chart by positioning a measure of known length on the object measured and regulating the distance of said object relatively to the chart until said measure subtends at the point of vision its true length on said chart, substantially as described.

In testimony whereof I have signed my name to this specification in the presence of two subscribing witnesses.

GERHARD MOE.

Witnesses:
H. R. GILBERTSON,
A. J. SOUTHERLAND.